United States Patent [19]

Murakami et al.

[11] Patent Number: 4,767,936
[45] Date of Patent: Aug. 30, 1988

[54] ELECTRONIC DEVICE OF ELEMENT ROW TYPE AND WIRING METHOD OF ITS ELECTRODE PATTERN

[75] Inventors: Hiroki Murakami; Takashi Ozawa, both of Ebina, Japan

[73] Assignee: Fuji-Xerox Company Ltd., Tokyo, Japan

[21] Appl. No.: 884,805

[22] Filed: Jul. 11, 1986

[30] Foreign Application Priority Data

Jul. 16, 1985 [JP] Japan ................................ 60-156711

[51] Int. Cl.⁴ ............................................. H01J 40/14
[52] U.S. Cl. ........................................ 250/578; 357/30
[58] Field of Search ................... 250/208, 209, 211 R, 250/211 J, 578; 357/30 D, 30 H, 30 K; 358/212, 213, 293, 294; 346/76 PH

[56] References Cited

U.S. PATENT DOCUMENTS

| | | | |
|---|---|---|---|
| 4,453,187 | 6/1984 | Komiya et al. | 358/213 |
| 4,495,409 | 1/1985 | Baji et al. | 250/578 |
| 4,499,384 | 2/1985 | Segawa et al. | 250/211 J |
| 4,565,928 | 1/1986 | Yamamoto et al. | 358/213 |
| 4,568,948 | 2/1986 | Moriguchi et al. | 346/76 PH |
| 4,595,934 | 6/1986 | Arai et al. | 346/76 PH |

Primary Examiner—David C. Nelms
Attorney, Agent, or Firm—Schwartz & Weinrieb

[57] ABSTRACT

An electronic device of the element row type, and a wiring method of its electrode pattern, is characterized by the disposition of a plurality of the elements being arranged in a longitudinal array which is divided into a plurality of blocks. A pair of driver devices are employed to drive the elements, and wiring patterns interconnect the elements to the driver devices. In accordance with the present invention, the wiring patterns include first portions which extend in a direction perpendicular to the longitudinal extent of the element array, and second portions which extend parallel to the longitudinal extent of the element array, with the parallel portions defining substantially the same width dimension regions, and wherein further, such width regions are overlapped with respect to each other such that the overall width of the wiring pattern for the electronic device may be substantially reduced as compared to those of prior art devices whereby miniaturization of the electronic device may be achieved.

20 Claims, 6 Drawing Sheets

ELECTRONIC DEVICE OF ELEMENT ROW TYPE AND WIRING METHOD OF ITS ELECTRODE PATTERN

BACKGROUND OF THE INVENTION

1. Field of the Invention

The present invention relates to an electronic device of an element row type such as a thermal head or an image sensor comprising a plurality of elements which are arranged in one row and are divided into a plurality of blocks to be sequentially driven in a block-by-block manner and, more specifically, to an improvement in such a device so as to reduce the area of the lead wiring electrode pattern and to realize the miniaturization of the device.

2. Description of the Prior art

Generally, such an electronic device as a thermal head, an image sensor, an LED display, a liquid crystal device or a print stylus device usually employs a divided-block driving system, that is, elements in the device are divided into a plurality of blocks and these blocks are sequentially driven in a block-by-block manner. By adopting this driving system, the number of IC driver devices can be reduced and thus the miniaturization and low cost of the device can be realized.

Figure 1:
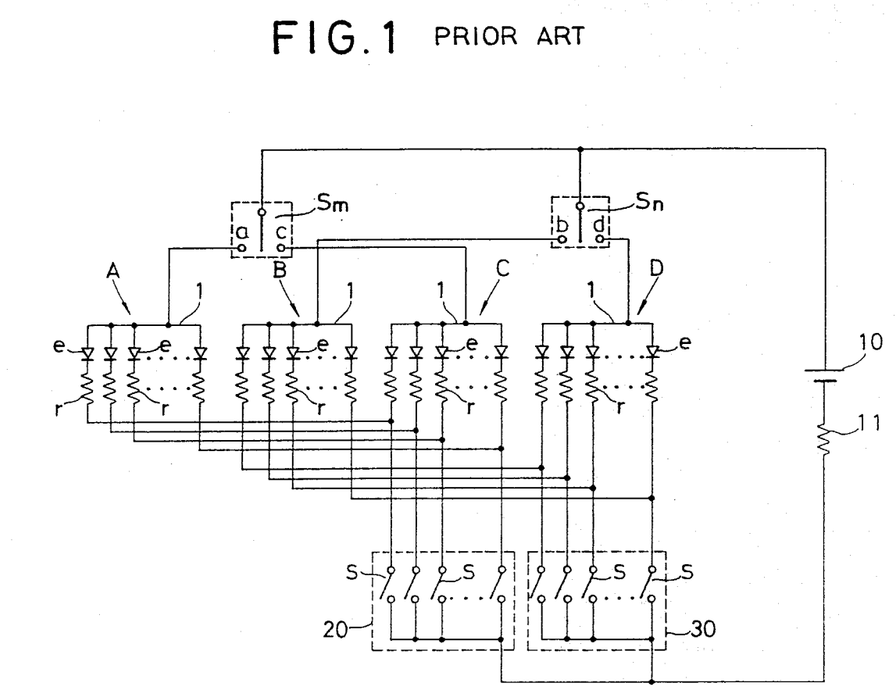
FIG. 1 is a circuit configuration of a prior art thermal head based on a 4-block division system.

Referring to FIG. 1, there is shown a circuit configuration of a thermal head which employs such a divided-block drive system. More particularly, the thermal head comprises a plurality of heating elements r which are divided into four blocks A, B, C and D to be driven in a block-by-block manner, and rectifier diodes e connected directly to the associated heating elements at one end thereof, the other ends of the rectifier diodes e in each block being connected to a common electrode 1. Switching circuits Sm and Sn are provided to select one of these divided block groups. That is, when the switching circit Sm is closed at its contact a, the block A is selected, while when the circuit Sm is closed at its contact c, the block C is selected. In the same manner, when the switching circuit Sn is closed at its contact b, the block B is selected, while when the circuit Sn is closed at its contact d, the block D is selected. The heating elements r in the block A are connected at their individual electrode ends (the ends of the elements opposite to the associated rectifier diodes) to the associated heating elements r in the block C at their individual electrode ends, while the heating elements r in the block B are connected at their individual electrode ends to the associated heating elements r in the block D at their individual electrode ends, these connected points being connected by conductor wires to a plurality of associated switching circuits S, respectively. The switching circuits S function to select one of the heating elements in each block. The switching circuits S are divided into two groups, one in a first IC device 20 for driving the heating elements in the blocks A and C and the other in a second IC device 30 for driving the heating elements in the blocks B and D. The switching circuits S in the first and second IC devices 20 and 30 are both used to select one of the heating elements. For example, in driving a thermal head of the type described above, when the switching circuit Sm is closed at the contact a and the switching circuits S of the first IC device 20 are sequentially turned ON, the heating elements in the block A are sequentially selected and therefore driven. When the switching circuit Sn is closed at the contact b and the switching circuits S of the second IC device 30 are sequentially turned ON, the heating elements in the block B are sequentially driven. In the same manner, the heating elements in the blocks C and D are sequentially driven. In this way, the heating elements in one block connected at their individual ends to the individual ends of the associated heating elements in a block located one block apart from that one block to divide the heating elements into two groups and the heating elements in one of the two groups are driven by the IC device different from that of the other, whereby it can be prevented that the same IC device is driven twice continuously during switching and driving of the blocks. In particular, in the case of an image sensor, it is necessary to take into consideration the storage time necessary to accumulate an electric charge signal excited by light. For this reason, such continuous driving of the same IC device undesirably prevents the realization of high speed operation of the image sensor. Incidentally, reference numeral 10 is a power supply, and 11 is a negative resistance as shown in FIG. 1.

Figure 2:
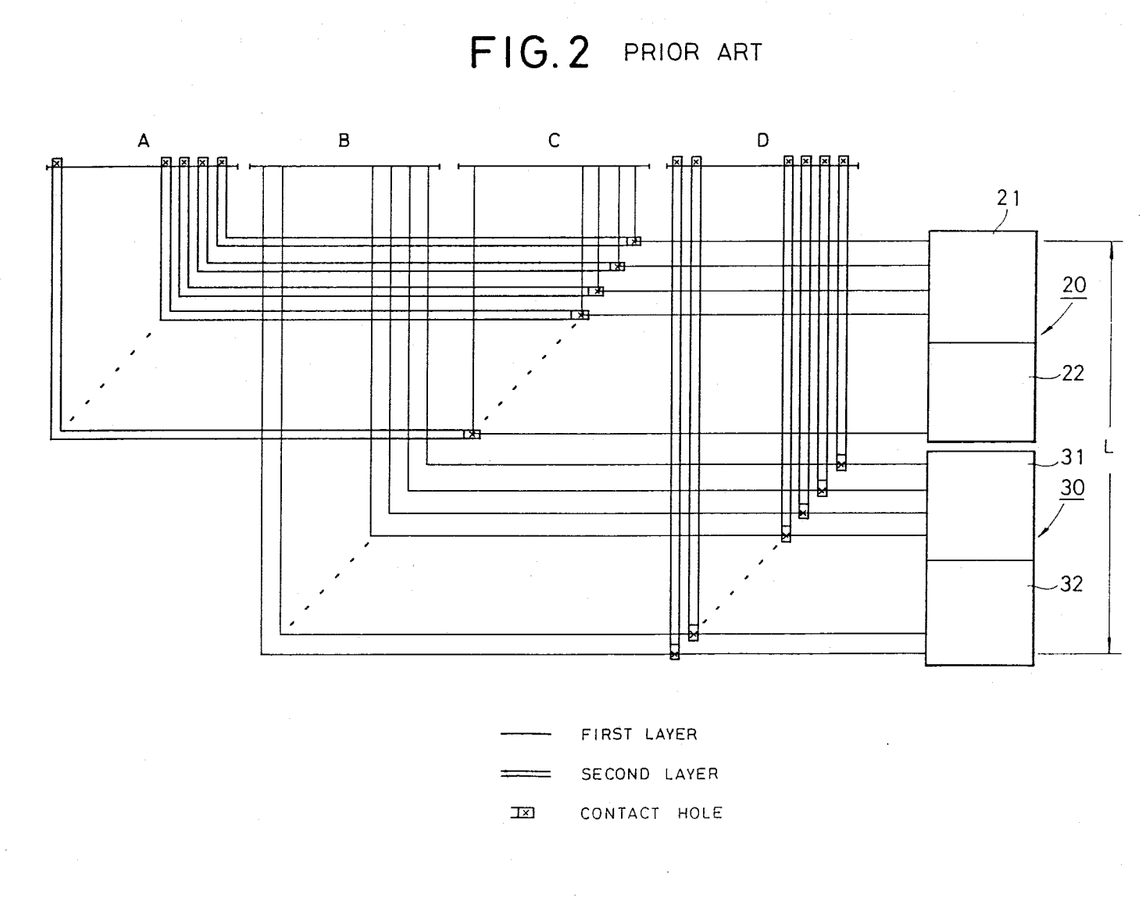
FIG. 2 is a schematic plan view showing a prior-art wiring example according to the circuit configuration shown in FIG. 1.

With the arrangement shown in FIG. 1, when 1024 of the heating elements r are connected by means of two wiring layers with a wire density of 8 wires/mm to the first and second IC devices 20 and 30 incorporating the 512-bit switching circuits S (each of the devices 20 and 30 comprising 2 128-bit IC devices), such IC wire interconnections as shown in FIG. 2 have been conventionally made. In more detail, in the prior art arrangement shown in FIG. 2, the heating elements in the blocks A and C are commonly connected at associated contact holes so as to be connected to two 128-bit IC devices 21 and 22 of the first device 20, whereas the heating elements in the blocks B and D are commonly connected at associated contact holes so as to be connected to two IC devices 31 and 32 of the second device 30. However, the prior art arrangement has been defective in that all the IC devices 21, 22, 31 and 32 must be positioned on one side of a substrate for the convenience of wiring and for the transmission of necessary signals applied to the IC devices and for connection to the power supply and furthermore, the two-layer formation of these conductor wires cannot be effectively carried out, which results in a wiring width L of the conductor wire area which becomes larger (in the case, 64 mm (=512/8)), making it difficult to make the resultant electronic device small in size and width.

OBJECT OF THE INVENTION

It is a primary object of the present invention to reduce the width of the conductor wire area connecting a plurality of converter elements and driver devices for driving the converter elements for realization of a small and thin electronic device.

SUMMARY OF THE INVENTION

In accordance with the present invention, the above object is attained by providing a positive multi-layer formation to the above conductor wires.

That is, the present invention provides an electronic device which comprises a plurality of elements divided into a plurality of blocks and first and second driver devices for driving the plurality of elements, and in which the elements in the odd-numbered blocks of the divided blocks are connected to the first driver device by means of a wiring pattern having first and second sections, the first and second sections being extended in a direction perpendicular to the array direction of the elements and in the element array direction respectively, whereas the elements in the even-numbered blocks of the divided blocks are connected to the second driver device by means of another wiring pattern having third and fourth sections, the third and fourth sections being extended in the direction perpendicular to the array direction of the elements and in the element array direction respectively, so that the first and second driver devices are alternately driven to sequentially drive the elements in a block-by-block manner, the improvement being that an area overlapped by the second and fourth sections is multi-layered so that the overlapped second and fourth section areas form different layers but of the same, coincident width dimension.

According to the present invention, the width of a printed wiring board in a direction perpendicular to the array direction of the converter elements arranged on the board can be made narrower, and thus the resultant electronic device can be made small in size and width.

BRIEF DESCRIPTION OF THE DRAWINGS

Various other objects, features, and attendant advantages of the present invention will become more apparent as the same becomes better understood from the following detailed description, when considered in connection with the accompanying drawings, in which like reference characters designate like or corresponding parts throughout the several views, and wherein.

DESCRIPTION OF THE PREFERRED EMBODIMENTS

Figure 3:
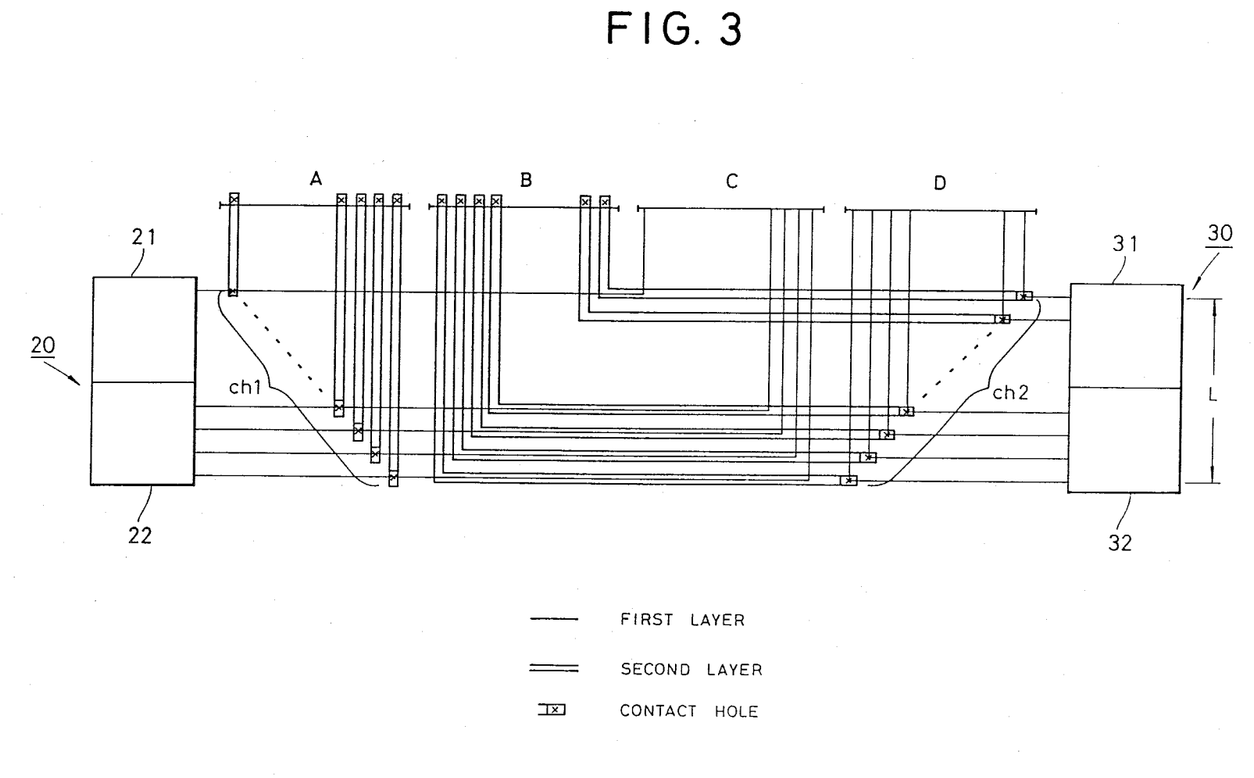
FIG. 3 is a schematic plan view showing an embodiment of the present invention.

Referring to FIG. 3, there is shown an embodiment of the present invention in which parts having the same functions as those in FIGS. 1 and 2 are denoted by the same reference numerals. In the present embodiment, a plurality of heating elements in a thermal head are divided into the blocks A, B, C and D, the heating elements in the blocks A and C are driven by the first IC device 20, and the heating elements in the blocks B and D are driven by the second IC device 30. As illustrated, the first and second IC devices 20 and 30 for driving these heating elements are located separately from each other upon opposite sides of a printed wiring board having the longitudinal array of the heating elements mounted thereon.

Interconnection between the heating elements in the four blocks and the first and second IC devices 20 and 30 is achieved by connecting conductor wires of the block A patterned in the second layer and conductor wires of the block C patterned in the first layer at associated contact holes ch1, and by connecting conductor wires of the block D patterned in the first layer and conductor wires of the block B patterned in the second layer at associated similar contact holes ch2. Further, as illustrated, conductor wires of the block B and conductor wires of the block C are efficiently patterned in the second and first layers of preceding zones of the blocks B and C, respectively.

With such an arrangement of the present invention, when 1024 of the heating elements are wired in the form of two layers at a wire density of 8 wires/mm to the four 128-bit IC devices 21, 22, 31 and 32, the width L of the conductor wire area can be reduced to ⅛ (32 (−256/8) mm) of that in the prior art.

Figure 4:
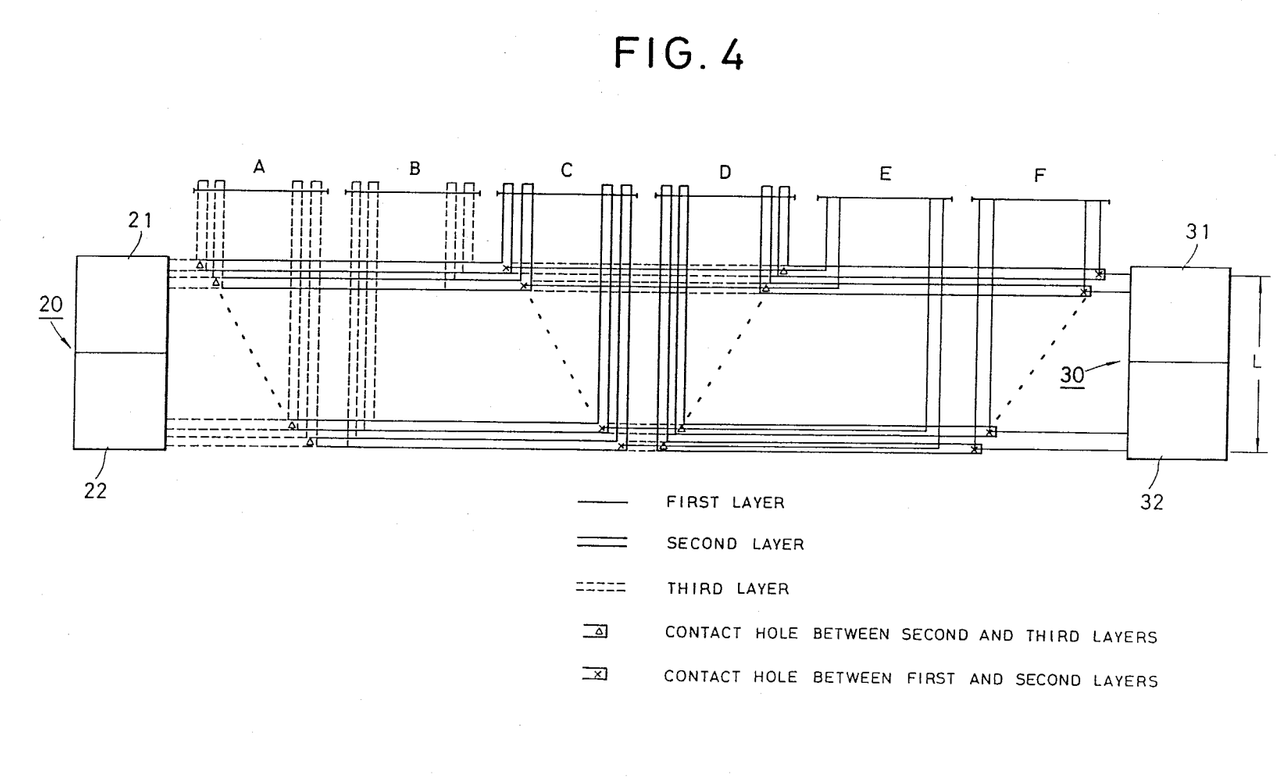
FIG. 4 is a schematic plan view showing another embodiment of the present invention.
Figure 5:
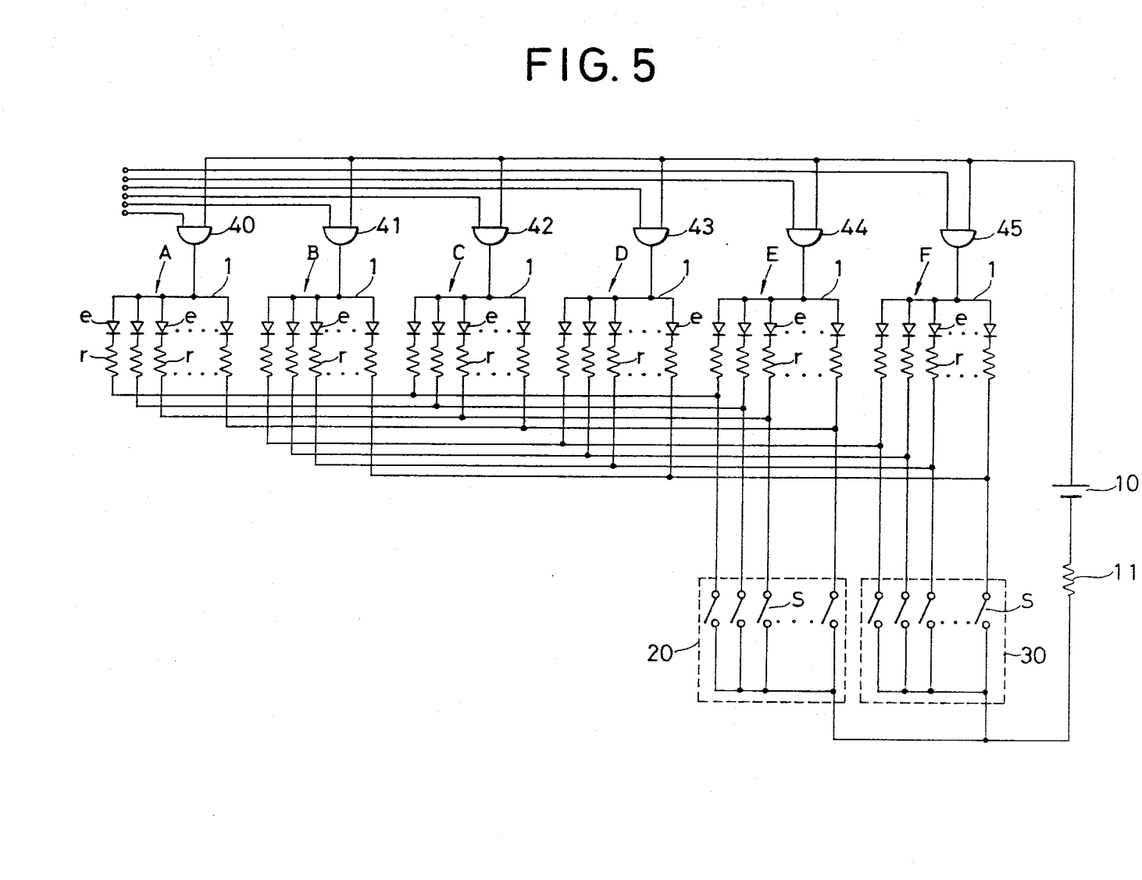
FIG. 5 is an equivalent circuit of the embodiment of FIG. 4.

Shown in FIG. 4 is another embodiment of the present invention in which the heating elements are divided into six blocks A, B, C, D, E and F and interconnection between the heating elements of the six blocks and the first and second IC devices 20 and 30 is effected in the form of three layer patterns. FIG. 5 shows an equivalent circuit of the second embodiment of FIG. 4. In FIG. 5, the switching circuits S incorporated in the first IC device 20 are used to individually select the heating elements in the blocks A, C and E and the switching circuits S incorporated in the second IC device 30 are used to individually select the heating elements in the blocks B, D and F, whereas gates 40 to 45 connected to the common electrode ends of the heating elements are used to select the blocks through sequential operation of the gates. More specifically, in the present embodiment, as shown in FIG. 4, conductor wires of the blocks A, C and E are formed in the third, second and first layers respectively and are connected to each other at associated contact holes so as to be connected to the first IC device 20 located on one side of the substrate, whereas conductor wires of the blocks B, D and F are formed in the third, second and first layers respectively and are connected to each other at associated contact holes so as to be connected to the second IC device 30 located on the other side (on the right side in FIG. 4) of the substrate. The heating elements have been divided into 6 blocks in the present embodiment, nevertheless the width L of conductor wire area can have the same width dimension L as that in the previous embodiment of FIG. 3.

Figure 6:
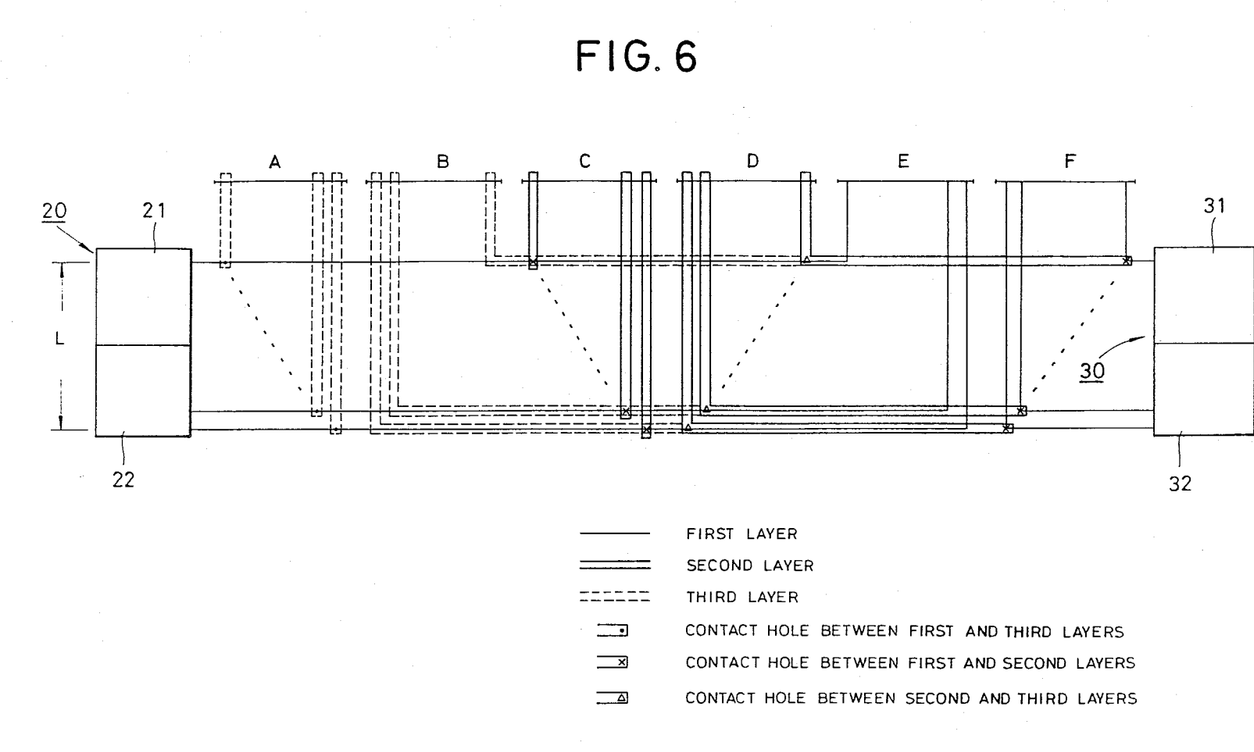
FIG. 6 is a further embodiment of the present invention based on the equivalent circuit of FIG. 5.

FIG. 6 shows another conductor wiring example of the circuit configuration shown in FIG. 5. As in the embodiment of FIG. 4, the embodiment of FIG. 6 can shorten the width L of the conductor wire area.

Although the four and six blocks have been driven on a block-by-block basis in the foregoing embodiments, it goes without saying that the present invention can be applied to another number of divided blocks for block division drive. For example, when it is desired to drive eight, twelve or any number of blocks more than four blocks on a block-by-block basis, the heating elements, conductor wire area and IC devices shown in FIG. 3 can be used as a basic unit component and a plurality of such components can be arranged in parallel along the array direction of the heating elements. Further, in the case of six, ten or any such number of blocks, unnecessary heating elements, IC devices, conductor wires can be removed from one of the above-mentioned basic components and the partly-removed component and other not-removed or complete components can be arranged in parallel.

In addition, the number of heating elements in one block, the wire density, the bit number of an IC device and the like may of course be arbitrarily selected at respectively suitable values depending on the circuit configuration.

The foregoing explanation has been made as to only two and three layer wiring patterns in the foregoing embodiments, but the present invention may be also applied to a four or more layer wiring pattern. In this connection, as the number of layers increases, the width of the conductor wire area can be further shortened.

It is also not necessary that the IC devices 20 and 30 be located separately upon both sides of the substrate, but to the contrary, they may be located at the same position on the substrate but in the different layers thereof.

Though the present invention has been applied to a thermal head in the foregoing embodiments, it should be understood that the invention is not limited to a thermal head application but is applicable to other electronic devices such as image sensors, LED displays, liquid crystal devices and print styluses.

Obviously, many modifications and variations of the present invention are possible in light of the above teachings. It is therefore to be understood that within the scope of the appended claims, the present invention may be practiced otherwise than as specifically described herein.

What is claimed is:

1. An electronic device of an element row type, comprising:
   a plurality of elements arranged in a longitudinal array and divided into a plurality of blocks;
   first and second driver devices for driving said plurality of elements;
   a first wiring pattern, for connecting the elements in odd-numbered blocks to said first driver device, including a first section extending in a direction perpendicular to the longitudinal extent of said longitudinal array of said elements, and a second section extending in a direction parallel to said longitudinal extent of said element array so as to define a first region having a predetermined width dimension for said first wiring pattern; and
   a second wiring pattern, for connecting the elements in even-numbered blocks to said second driver device, including a third section extending in a direction perpendicular to said longitudinal extent of said longitudinal element array, and a fourth section extending in a direction parallel to said longitudinal extent of said element array so as to define a second region having a predetermined width dimension for said second wiring pattern which is substantially the same as said first predetermined width dimension of said first width region of said first wiring pattern;
   said first and second wiring patterns being provided upon a substrate in the form of overlapping multi-layers in which said second and fourth sections are provided in mutually different ones of said overlapping multi-layers wherein said first and second width regions are disposed in overlapping relationship so as to define a composite width region having a width dimension which is substantially the same as said first and second width dimensions of said first and second width regions.

2. An electronic device as set forth in claim 1, wherein:
   said first and second driver devices are separated from each other as a result of being disposed upon said substrate at opposite ends of said first and second wiring patterns.

3. An electronic device as set forth in claim 1, wherein said elements are photoelectric converting elements and said first and second driver devices have switching circuits which selectively drive said photoelectric converting elements.

4. An electronic device as set forth in claim 1, wherein said elements are heating elements and said first and second driver devices have switching circuits which selectively drive said heating elements.

5. An electronic device as set forth in claim 1, wherein:
   said first and second driver devices are connected to said second and fourth sections of said first and second wiring patterns so as to be disposed substantially within said predetermined composite width region.

6. An electronic device as set forth in claim 1, wherein:
   said first and second driver devices are disposed upon said substrate at the same end of said first and second wiring patterns.

7. An electronic device as set forth in claim 1, wherein:
   said first section of said first wiring pattern includes electrode portions which are connected to said elements of interconnected odd-numbered blocks wherein said electrode portions for each one of said interconnected odd-numbered blocks are disposed within a layer of said multi-layered wiring patterns which is different from the layer within which the electrode portions for each one of the other ones of said interconnected odd-numbered blocks are disposed.

8. An electronic device as set forth in claim 1, wherein:
   said third section of said second wiring pattern includes electrode portions which are connected to said elements of interconnected even-numbered blocks wherein said electrode portions for each one of said interconnected even-numbered blocks are disposed within a layer of said multi-layered wiring patterns which is different from the layer within which the electrode portions for each one of the other ones of said interconnected even-numbered blocks are disposed.

9. An electronic device as set forth in claim 1, wherein:
   said elements are disposed within four blocks; and
   said multi-layered wiring patterns comprise two layers.

10. An electronic device as set forth in claim 1, wherein:
    said elements are disposed within six blocks; and
    said multi-layered wiring patterns comprise three layers.

11. An electronic device as set forth in claim 1, further comprising:
    first switching means for selectively connecting a particular one of said odd-numbered blocks to said first driver device; and
    second switching means for selectively connecting a particular one of said even-numbered blocks to said second driver device.

12. An electronic device as set forth in claim 1, further comprising:
    means within each of said first and second driver devices for selectively connecting each of said elements of said off and even-numbered blocks, respectively.

13. A method of wiring electrode patterns used in an electronic device having a plurality of elements arranged in a longitudinal array and divided into a plurality of blocks, and first and second driver devices for driving said plurality of elements, comprising the steps of:

connecting the elements in odd-numbered blocks to said first driver device by means of a first wiring pattern having a first section extending in a direction perpendicular to the longitudinal extent of said longitudinal array of said plurality of elements, and a second section extending in a direction parallel to said longitudinal extent of said element array so as to define a first region having a predetermined width dimension for said first wiring pattern;

connecting the elements in even-numbered blocks to said second driver device by means of a second wiring pattern having a third section extending in a direction perpendicular to the longitudinal extent of said longutudinal element array, and a fourth section extending in a direction parallel to said longitudinal extent of said element array so as to define a second region having a predetermined width dimension for said second wiring pattern which is substantially the same as said first predetermined width dimension of said first width region of said first wiring pattern; and     providing said second and fourth sections of said first and second wiring patterns upon a substrate in the form of overlapping multi-layers in which said second and fourth sections are disposed within mutually different layers of said overlapping multi-layers wherein said first and second width regions are disposed in overlapping relationship so as to define a composite width region having a width dimension which is substantially the same as said first and second width dimensions of said first and second width regions.

14. A method as set forth in claim 13, wherein:
said first and second driver devices are separated from each other as a result of being disposed upon said substrate at opposite ends of said first and second wiring patterns.

15. A method as set forth in claim 13, wherein said elements are photoelectric converting elements and said first and second driver devices have switching circuits which selectively drive said photoelectric converting elements.

16. A method as set forth in claim 13, wherein said elements are heating elements and said first and second driver devices have switching circuits which selectively drive said heating elements.

17. A method as set forth in claim 13, further comprising the step of:
connecting said first and second driver devices to said second and fourth sections of said first and second wiring patterns such that said first and second driver devices will be disposed substantially within said predetermined composite width region.

18. A method as set forth in claim 13, further comprising the step of:
disposing said first and second driver devices upon said substrate at the same end of said first and second wiring patterns.

19. A method as set forth in claim 13, further comprising the step of:
connecting electrode portions of said first section of said first wiring pattern to said elements of interconnected odd-numbered blocks such that said electrode portions for each one of said interconnected odd-numbered blocks are disposed within a layer of said multi-layered wiring patterns which is different from the layer within which the electrode portions for each one of the other ones of said interconnected odd-numbered blocks are disposed.

20. A method as set forth in claim 13, further comprising the step of:
connecting electrode portions of said third section of said second wiring pattern to said elements of interconnected even-numbered blocks such that said electrode portions for each one of said interconnected even-numbered blocks are disposed within a layer of said multi-layered wiring patterns which is different from the layer within which the electrode portions for each one of the other ones of said interconnected even-numbered blocks are disposed.

* * * * *